(12) United States Patent
Borkenhagen et al.

(10) Patent No.: US 7,577,793 B2
(45) Date of Patent: Aug. 18, 2009

(54) PATROL SNOOPING FOR HIGHER LEVEL CACHE EVICTION CANDIDATE IDENTIFICATION

(75) Inventors: John Michael Borkenhagen, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/335,765

(22) Filed: Jan. 19, 2006

(65) Prior Publication Data
US 2007/0168617 A1 Jul. 19, 2007

(51) Int. Cl.
G06F 12/00 (2006.01)
G06F 13/00 (2006.01)
G06F 13/28 (2006.01)

(52) U.S. Cl. .................................... 711/133
(58) Field of Classification Search .................. 711/133
See application file for complete search history.

(56) References Cited

U.S. PATENT DOCUMENTS

| | | | | |
|---|---|---|---|---|
| 5,530,832 A | * | 6/1996 | So et al. ........................ | 711/122 |
| 5,829,038 A | | 10/1998 | Merrell et al. | |
| 5,850,534 A | * | 12/1998 | Kranich ........................ | 711/144 |
| 6,343,344 B1 | * | 1/2002 | Arimilli et al. ............... | 711/128 |
| 6,725,337 B1 | * | 4/2004 | Tan et al. ..................... | 711/133 |
| 2006/0212654 A1 | * | 9/2006 | Balakrishnan ............... | 711/125 |
| 2007/0073974 A1 | * | 3/2007 | Averill et al. ................ | 711/133 |
| 2007/0186045 A1 | * | 8/2007 | Shannon et al. ............. | 711/133 |

OTHER PUBLICATIONS

"MRU Update Control for Multiple Level Caches", IBM Technical Disclosure Bulletin, IBM Corp. New York, US, vol. 34, No. 6, Nov. 1, 1991, pp. 59-60, XP000228351, ISSN: 0018-8689.
"Cache Replacement Algorithm Based on the Inclusion Property and the Least Recently Used Policy for Shared Secondary Caches" IBM Technical Disclosure Bulletin, IBM Corp. New York, US, vol. 39, No. 6, Jun. 1996, pp. 139-142, XP000678550, ISSN: 0018-8689.
"Modified L2 Cache Replacement for Retaining Hot L1 Cache Lines" IBM Technical Disclosure Bulletin, IBM Corp. New York, US, vol. 36, No. 4, Apr. 1, 1993, p. 383, XP000364553, ISSN: 0018-8689.

* cited by examiner

*Primary Examiner*—Sheng-Jen Tsai
(74) *Attorney, Agent, or Firm*—Robert R. Williams

(57) ABSTRACT

A computer system having patrol snoop sequencer that sequences through addresses of cache lines held in a higher level cache, making snoop reads using those addresses to a lower level cache. If a particular cache line held in the higher level cache is not held in the lower level cache, the particular cache line is identified as an eviction candidate in the higher level cache when a new cache line must be loaded into the higher level cache.

7 Claims, 7 Drawing Sheets

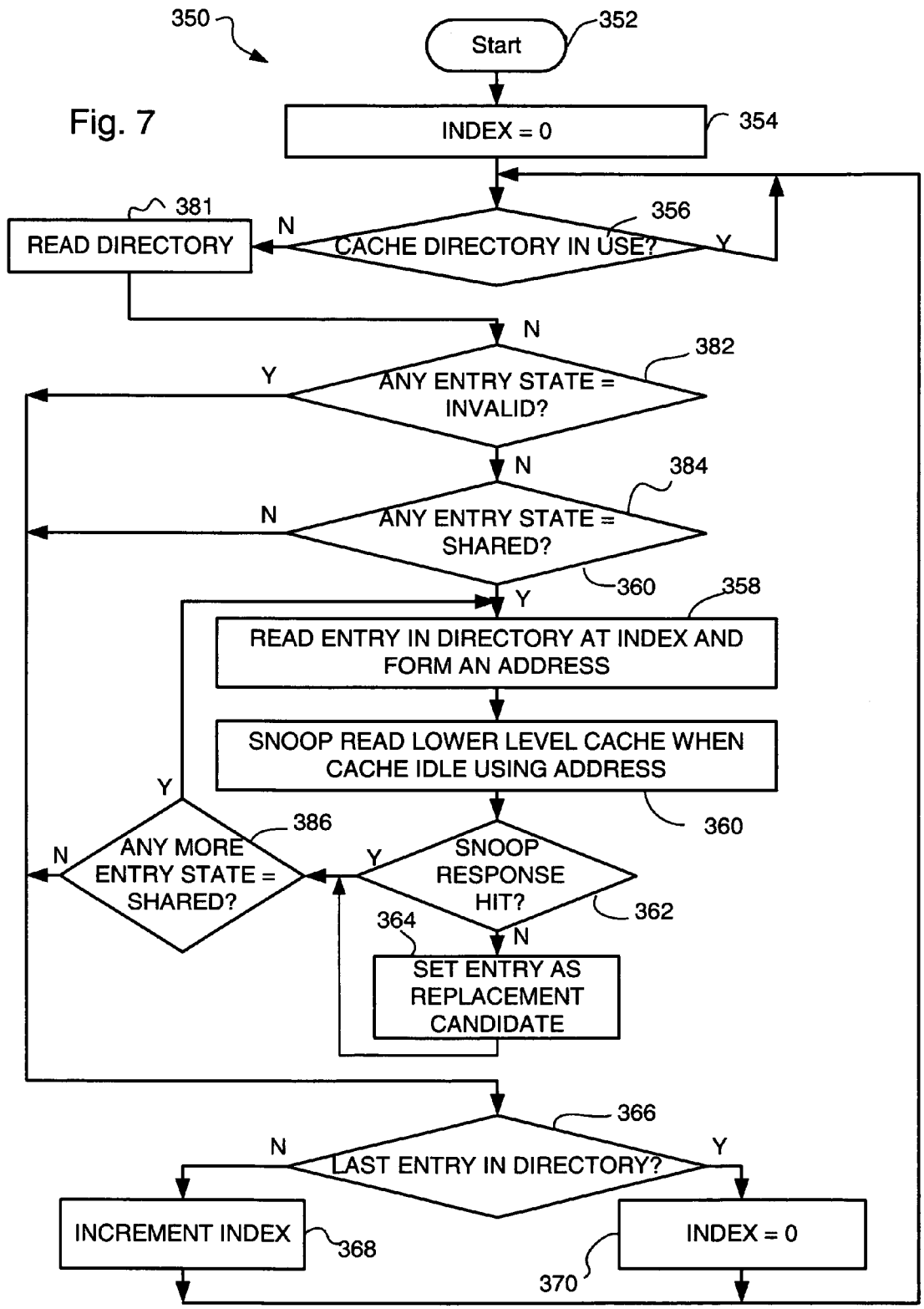

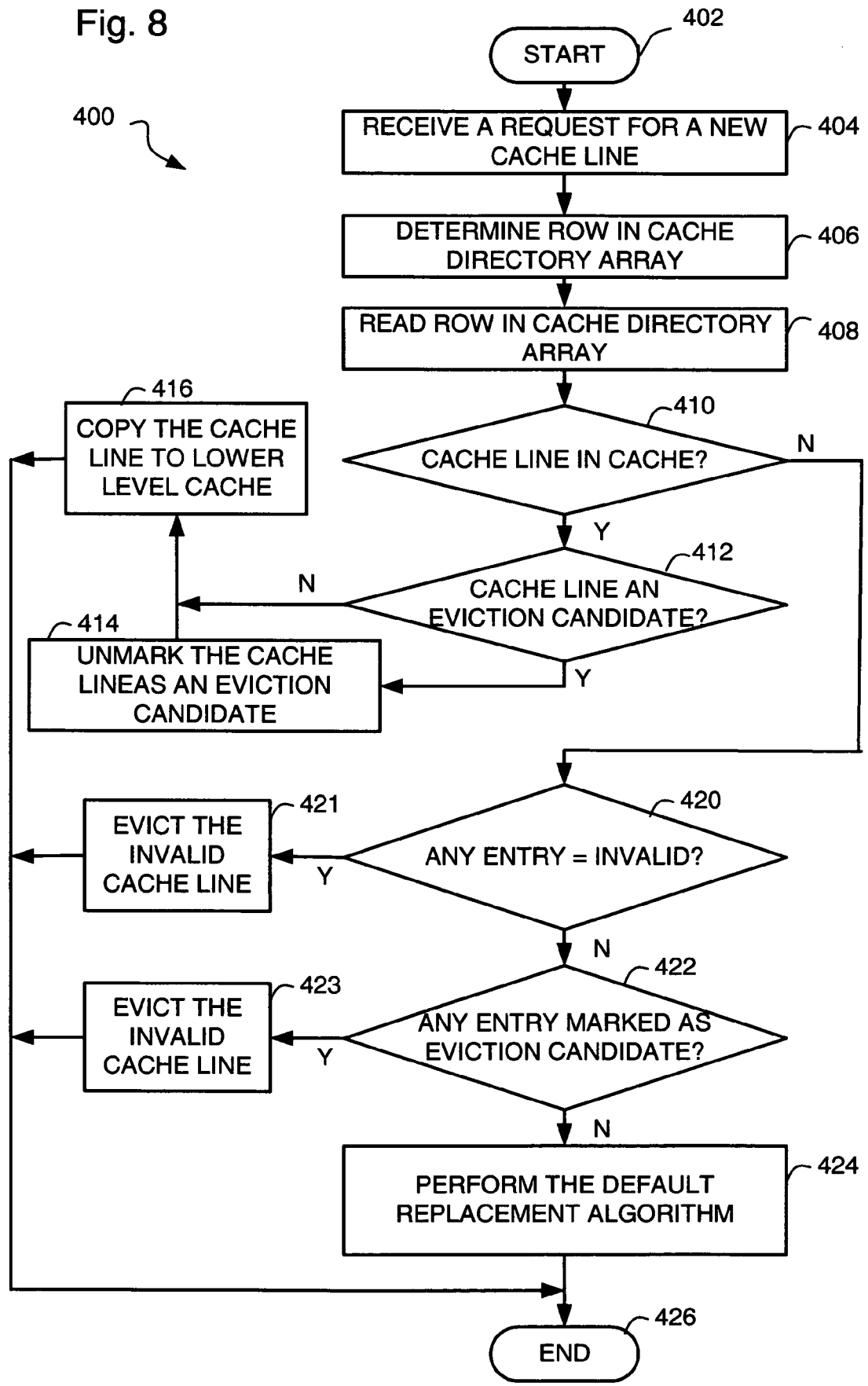

PATROL SNOOPING FOR HIGHER LEVEL CACHE EVICTION CANDIDATE IDENTIFICATION

BACKGROUND OF THE INVENTION

1. Field of the Invention

This invention relates generally to multiple levels of cache. More particularly, this invention relates to identifying a cache line in a higher level cache that is a candidate for eviction in the higher level cache when a new cache line must be loaded into the higher level cache.

2. Description of the Related Art

Modern computer systems typically use multiple levels of cache. For example, a very fast, but relatively small, first level cache is typically implemented on a same semiconductor chip as a processor, and provides data to the processor within one or two processor cycles. The first level cache (L1 cache) is usually implemented using static random access memory (SRAM) that is very fast, but not as compact as larger, slower, memory. The first level cache must be relatively small, also, to limit length of control, address, and signal interconnect. A second level cache (L2 cache) is often also implemented on the same semiconductor chip as the processor in modern computer systems. The second level cache is often also built using SRAM memory. The second level cache is typically larger than the first level cache both in physical area and in amount of data that is stored. The second level cache is typically slower to access (read or write) than the first level cache. Modern computer systems also comprise a third level cache (L3 cache) that holds even more data than the second level cache and takes even longer to access. Often, the third level cache is implemented with dynamic random access memory (DRAM), although SRAM memory is also sometimes used for third level cache designs.

A cache stores data in blocks called cache lines. For example, in various computer systems, a cache line might be 64 bytes, 128 bytes, 256 bytes, and so on. A cache line is stored in a cache line location in a cache based upon an address of the cache line and replacement logic coupled to the cache. A cache directory coupled to the cache maintains state information and tag information for each cache line stored in the cache.

When a processor requests a piece of data at a particular address, the computer system checks if the data is stored in the first level cache. The particular address is presented to a first level cache directory which determines if the data is stored in the first level cache. If a cache line containing the piece of data exists in the first level cache, the data will be fetched from the first level cache for use by the processor; this is known as a cache hit in the first level cache. If the cache line containing the piece of data is not held in the first level cache, a cache miss is reported by the first level cache. A request is then made to a second level cache. If the second level cache holds the particular piece of data, the cache line containing the particular piece of data is fetched from the second level cache and stored in the first level cache. In many implementations, the particular piece of data is made available to the processor while the cache line containing the particular piece of data is being written into the first level cache. If the particular piece of data is not held in the second level cache, a request is made to a third level cache. If the particular piece of data is held in the third level cache, the cache line including the particular piece of data is fetched from the third level cache and stored in the second level cache and the first level cache and made available to the processor. If a cache miss occurs in the third level cache, a further request is made to a fourth level cache, if a fourth level cache exists, or to main memory.

Since a lower level of cache holds less data than a higher level of cache, a number of cache line positions in the higher level of cache map to fewer cache line positions in the lower level of cache. In modern computer systems, a cache is typically designed with associativity. Associativity means that a particular cache line maps to a particular set (row) in a cache, but replacement logic supporting the cache can place the particular cache line in any of a number of classes (cache line locations) in the set. A particular class in a particular set is a cache line position. For example, for a four-way associative second level cache, the replacement logic chooses into which of four classes to store a particular cache line that maps to a particular set.

When a cache line is written into a cache from a higher level cache, a cache line must be evicted (written to a higher level cache, or, if data in the cache line has not been modified, simply be written over).

In a cache with associativity, a replacement algorithm chooses which cache line in a set is replaced. For example, if a cache is eight-way associative, that is, has eight classes per set, one cache line out of eight must be evicted to make room for a new cache line that has an address that maps to the set.

A number of replacement algorithms have been implemented in various computer systems. Least Recently Used (LRU) algorithms have had wide usage, with the notion that a more recently used cache line is more likely to be needed again than a cache line that has not been as recently used. A problem with the LRU algorithm is that a particular cache line can appear to be not used for a relatively long period of time for two reasons. A first reason is that a processor no longer needs data in the particular cache line and has loaded another cache line, overwriting the particular cache line. A second reason is that a processor is frequently using data in the particular cache line and has not updated the higher level cache for some time. If the particular cache line appears to the higher level cache to be a candidate for eviction based on an LRU algorithm, but data in the particular cache line is being frequently used as explained for the second reason, inefficienges will occur when the higher level cache evicts the particular cache line, since eviction will also include eviction from the lower level cache. Since data in the particular cache line is being frequently used, the processor will simply have to request the cache line again and the processor will have to wait until the cache line is retrieved from a level higher than the higher level cache.

Because of the problems with LRU as explained above, many computer systems having multiple levels of cache have implemented a pseudo random eviction algorithm in the higher level cache, in effect, admitting that the higher level cache does not know which cache line in a set in the higher level cache is a preferred candidate for eviction, and just picks one cache line at random from the set for eviction. Unfortunately, the pseudo random eviction algorithm also often evicts cache lines that are being frequently used by the processor, again causing the processor to wait for evicted cache lines to be fetched from memory at a higher level than the higher level cache.

Therefore, there is a need for a method and apparatus that provides for an improved eviction scheme in a higher level cache.

SUMMARY OF THE INVENTION

The present invention a method and apparatus to increase performance of a computer system by providing improved cache line replacement.

In an embodiment, a cache line in a higher level cache is identified as not existing in a lower level cache. Since cache lines in the higher level cache that do not exist in a lower level cache no longer need to be stored in the higher level cache, such cache lines are marked as eviction candidates. When the higher level cache must replace a cache line in a set having a number of classes, a cache line marked as an eviction candidate is preferentially evicted instead of a cache line not marked as an eviction candidate.

In an embodiment of the invention, a patrol snoop sequencer in a memory controller having the higher level cache reads directory entries from a higher level cache directory at times when the higher level cache directory is not being otherwise used. Using information from the higher level cache directory, the patrol snoop sequencer makes snoop reads to a lower level cache directory at times when a processor memory bus and the lower level cache directory are not being otherwise used. If the lower level cache directory reports a cache miss for a particular snoop read, the patrol snoop sequencer, when the higher level cache directory is not otherwise being used, updates state information in the higher level cache directory to identify the corresponding cache line as an eviction candidate. A snoop read is any command sent from a patrol snoop sequencer associated with a higher level cache to a lower level cache directory that can determine if a particular cache line in the higher level cache exists in the lower level cache; the command not causing an eviction in the lower level cache.

The patrol snoop sequencer in the memory control continues cycling through entries in the higher level cache directory, using time periods when the higher level cache directory, the processor memory bus, and the lower level cache directory are not being otherwise used, looking for cache line eviction candidates. Replacement logic in the memory control uses the eviction candidate information to evict cache lines that are no longer needed in the higher level cache before a cache line that, in some circumstances, is still needed in the higher level cache.

BRIEF DESCRIPTION OF THE DRAWINGS

FIG. 7 is a flowchart of a second method for determining eviction candidates in a higher level cache.

FIG. 8 is a flowchart of a method using eviction candidate information to augment a cache replacement algorithm.

DETAILED DESCRIPTION OF THE PREFERRED EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention provides a method and apparatus to determine eviction candidates in a higher level cache. In a hierarchical cache system (i.e., a cache system having a higher level cache and a lower level cache), all cache lines in a lower level cache also exist in a higher level cache. However, a particular cache line in a higher level cache may not exist in a lower level cache. For example, a processor may request a first data in a first cache line that must be loaded into the lower level cache. The processor reads the first data. Later, the processor may request a second data in a second cache line that must be loaded into the lower level cache. The first cache line has not been modified, so the second cache line is simply written over the first cache line. The higher level cache is not informed by prior art methods and apparatus that the first cache line is no longer in the lower level cache.

Embodiments of the present invention enable the higher level cache to make "snoop reads" using cache directory entries in the higher level cache to the lower level cache during times that cache directories and busses are not being used. A snoop read is any command sent from a patrol snoop sequencer associated with a higher level cache to a lower level cache directory that can determine if a particular cache line in the higher level cache exists in the lower level cache; the command not causing an eviction of a cache line in the lower level cache. If a snoop read results in a cache hit in the lower level cache, the cache line addressed by the cache directory entry from the higher level cache still exists in the lower level cache. If a snoop read results in a cache miss in the lower level cache, the cache line addressed by the cache directory entry from the higher level cache does not exist in the lower level cache, and the cache line addressed by the cache directory entry in the higher level cache is marked as an eviction candidate. Cache lines in a set in the higher level cache that are marked as eviction candidates are chosen for eviction over cache lines in the set in the higher level cache that are not marked as eviction candidates. Some caches use state information that includes an "invalid" state. A cache line having an invalid state is typically the first cache line to be evicted.

Figure 1:
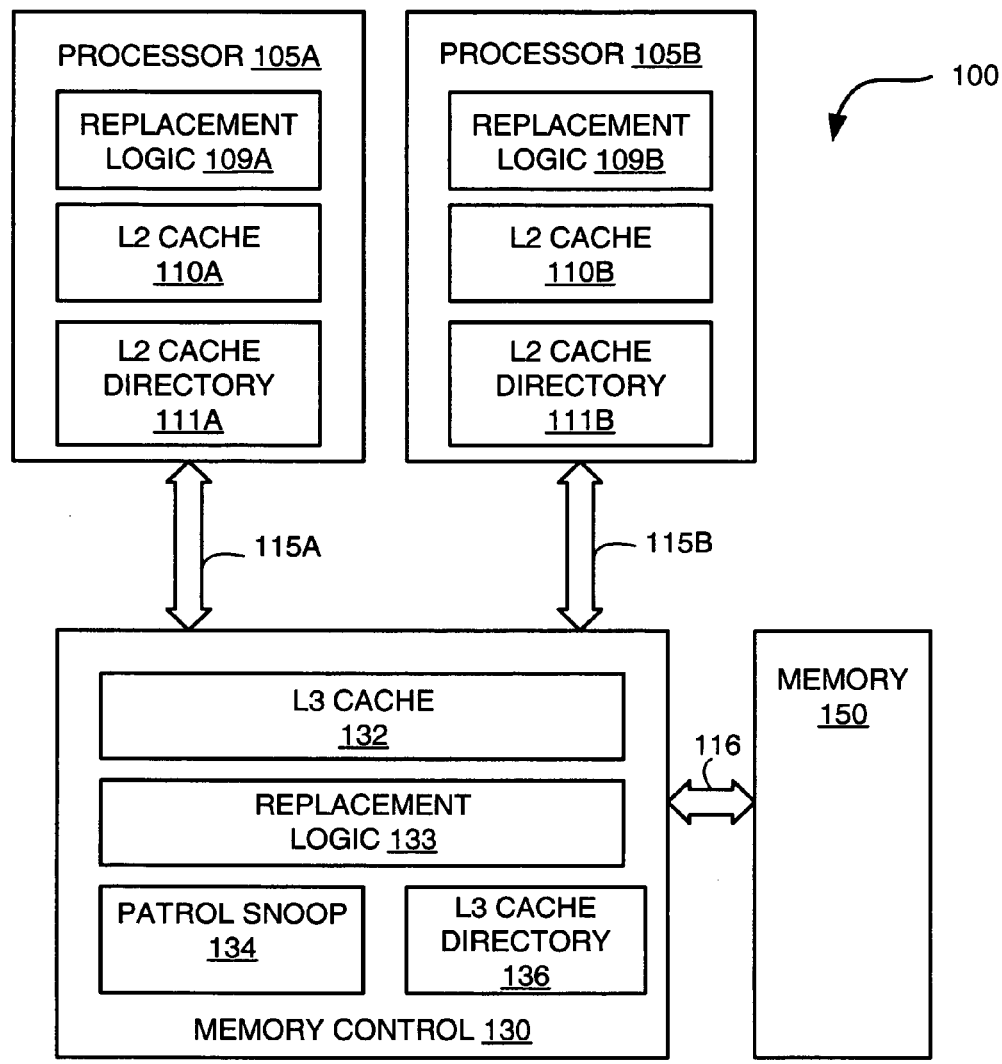
FIG. 1 is a block diagram of a computer system including one or more processors, a memory control and a memory.

Turning now to FIG. 1, a computer system 100 is shown in sufficient detail to explain embodiments of the present invention. It will be understood that computer systems further comprise disk memory, network interfaces, user interfaces, and the like.

Computer system 100 comprises one or more processors 105, shown as processors 105A and 105B. Each processor 105 further comprises an L2 cache 110 an associated L2 cache directory, and replacement logic 109. Replacement logic 109 chooses which cache line in L2 cache 110 to replace (evict) when replacement with a new cache line is required. Processor 105A is shown to include L2 cache 11OA, L2 cache 111A, and replacement logic 109A; processor 105B is shown to include L2 cache 110B, L2 cache 111B, and replacement logic 109B. It will be understood that in many computer systems, an L2 cache is shared by more than one processor.

Processors 105A and 105B are coupled to memory control 130 by processor memory bus 115A and processor memory bus 115B. It will be understood that some processors are coupled to memory controls using a common bus instead of separate busses (115A, 115B) as depicted. Generically, a processor memory bus will be referred to as processor memory bus 115.

Memory control 130 includes an L3 cache 132 and an L3 cache directory 136 similar to what is used in existing computer systems. Memory control 130 further includes a patrol snoop sequencer 134. A replacement logic 133 in memory control 130 implements a cache line replacement method that uses information stored in the L3 cache directory 136 by patrol snoop sequencer 134. As will be described in more detail later, patrol snoop sequencer 134 uses times when resources (L3 cache directory 136, memory processor bus 115, and L2 cache directory 111) are idle (i.e., not being accessed). Snoop sequencer 134 uses such idle times of those resources to perform snoop reads using addresses in the L3 cache directory 136. The snoop sequencer cycles through L3 cache directory entries for cache lines (using addresses of the cache lines) to determine which cache lines in the L3 cache 132 do not exist in L2 caches 110A and 110B, and marking any such cache lines as eviction candidates in L3 cache 132.

Memory control 130 is coupled to memory 150 via bus 116. Memory 150 in computer system 100 is a main memory of computer system 100. In another embodiment of computer system 100, memory 150 may be a level 4 (L4) cache.

Figure 2:
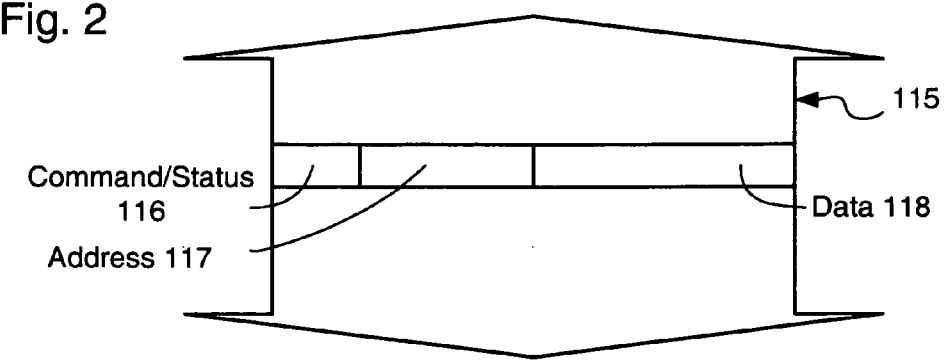
FIG. 2 shows additional detail of a processor memory bus shown in FIG. 1.

FIG. 2 shows a processor memory bus 115. It will be understood that there are many configurations that have been implemented to communicate between a processor 105 and a memory control 130. Processor memory bus 115 is shown to comprise a command/status 116; an address 117; and a data 118. Command/status 116 is used to transfer commands (e.g., read, write), and status (cache miss, cache hit, and, in some embodiments, snoop read). Address 117 is used to transfer addresses. For example, when a processor 105 needs data at a particular address, and that data is not in L2 cache 110, the particular address is transmitted on address 117 to memory control 130. Data is transferred on data 118. For example, modified cache lines are written from L2 cache 110 to L3 cache 132. Cache lines are sent to L2 cache 110 from L3 cache 132, responsive to requests from processor 105. It will be understood that, in many implementations, information is multiplexed over a particular processor memory bus 115. For example, if data 118 is eight bytes wide but a cache line is 64 bytes wide, eight cycles are required to transfer a cache line. Similarly, in some computer systems, address 117 uses the same physical wires as data 118, but is multiplexed.

Figure 3A:
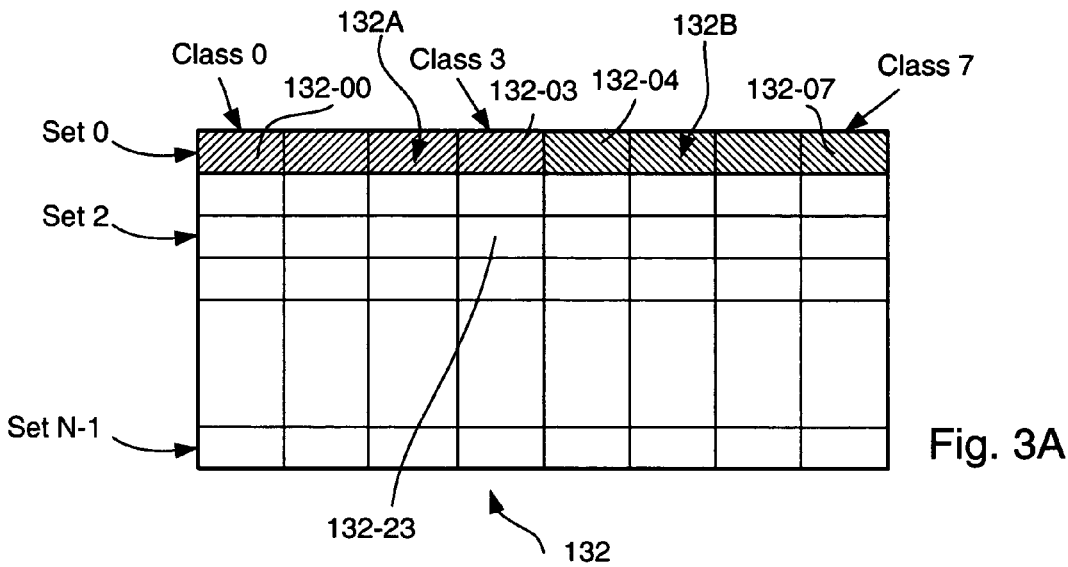
FIG. 3A shows a block diagram of a higher level cache.

FIG. 3A shows L3 cache 132 in more detail. For purposes of explanation, L3 cache 132 is eight-way set associative; that is, each set (row) contains eight classes; classes 0 through 7 (Classes 0, 3, and 7 identified with arrows). L3 cache 132 is shown to have N sets (sets 0 through N–1), Sets 0, 2, and N–1 identified with arrows. A particular cache line is mapped, using a portion of the address of the cache line, to a particular set in L3 cache 132. Replacement logic 133 in memory control 130 determines into which class the particular cache line is placed. The particular cache line can be placed in any of the eight classes each time the particular cache line is loaded into cache 132. Several cache line locations for cache lines are identified in FIG. 3A, referenced by set and row. For example, cache line location 132-00 is set zero, class zero in L3 cache 132. Similarly cache line location 132-03 is the set zero, class three in L3 cache 132. Cache line locations 132-07 and 132-23 are shown with a similar naming convention. Cache lines in L3 Cache 132 must map to L2 cache 110, shown in FIG. 3B. L2 cache 110 is smaller than L3 cache 132, and is typically designed with less associativity (i.e., fewer classes) than L3 cache 132. For purposes of explanation, subset 132A of L3 cache 132 (shown by arrow and first crosshatch pattern in FIG. 3A) maps to set 1 of L2 cache 110; subset 132B (shown by arrow and second crosshatch pattern in FIG. 3A) maps to set 3 of L2 cache 110B.

It will be understood that this mapping is for exemplary purposes only and that there are many ways to map particular cache line locations in a higher level cache to a lower level cache. For example, FIG. 3C shows one example of a map. An address, such as a 32-bit address a processor 105 uses, has a portion used to identify bits within a cache line. If a cache line contains 128 bytes, the portion entitled "byte in cache line" in FIG. 3C will have seven bits. A portion entitled "L2 Index" contains as many bits as is required to determine which set in L2 cache 110 a cache line will map to. For example, if L2 cache 110 has 1024 sets, L2 Index in FIG. 3C requires ten bits. The portion entitled "L2 Tag" is a tag portion of the address that must be stored in a tag field in an L2 cache directory, as will be explained with reference to FIGS. 5A-5C. L3 cache 132 is larger than L2 cache 110, that is, holds more cache lines. Cache lines held in L2 cache 110 are the same number of bytes as cache lines held in L3 cache 132, so the "byte in cache line" portion of the address is the same portion of the address for cache lines in L3 cache 132. Address portion entitled "L3 Index" shown in FIG. 3C has more bits than address portion entitled "L2 Index". For example, if L3 cache 132 has 4096 sets, L3 Index shown in FIG. 3C requires twelve bits. The address portion, "L3 Tag" shown in FIG. 3, must be stored in a tag entry in an L3 cache directory, as will be explained later. Other mapping techniques "hash" portions of the address. Any mapping is contemplated.

Figure 3B:
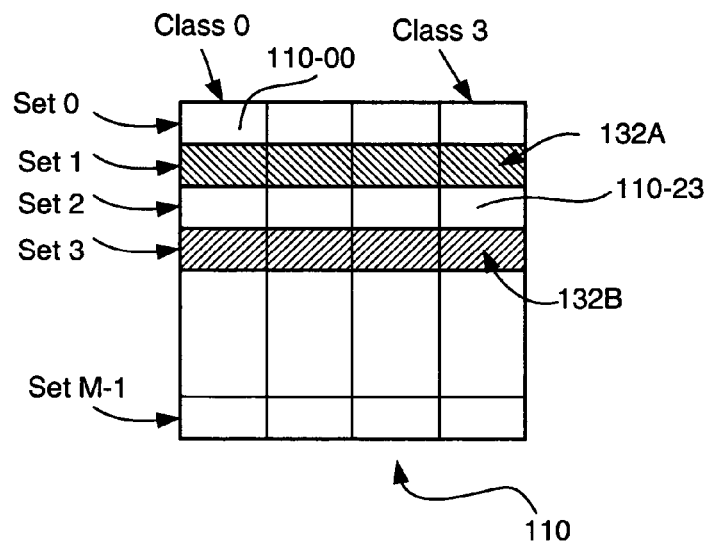
FIG. 3B shows a block diagram of a lower level cache.
Figure 3C:
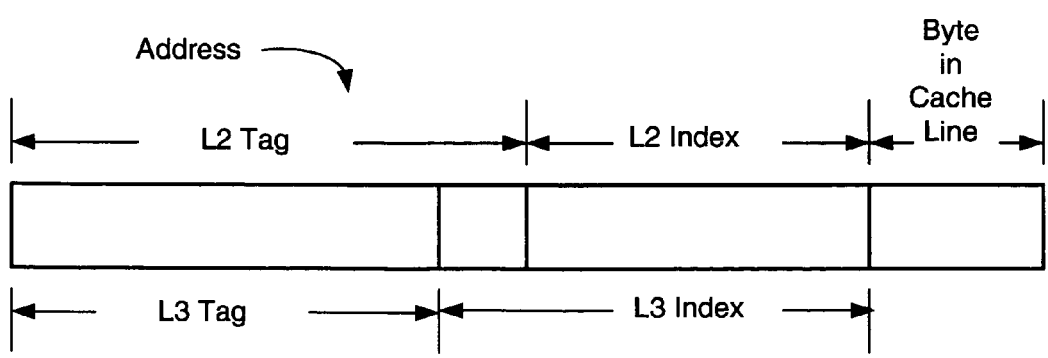
FIG. 3C shows an exemplary address with L2 and L3 tag portions and L2 and L3 Index portions, as well as a portion used to determine a byte within a cache line.

L2 cache 110 is shown in FIG. 3B to have M sets (0-M-1), and L2 cache 110 is shown to be four way set associative, that is, having four classes, class 0 through class 3. Subsets 132A and 132B are shown as explained above. Cache line locations 110-00 (set zero, class zero of L2 cache 110); and 110-23 (set two, class three of L2 cache 110) are shown to illustrate set/class naming convention, as was done above for L3 cache 132.

Figure 4A:
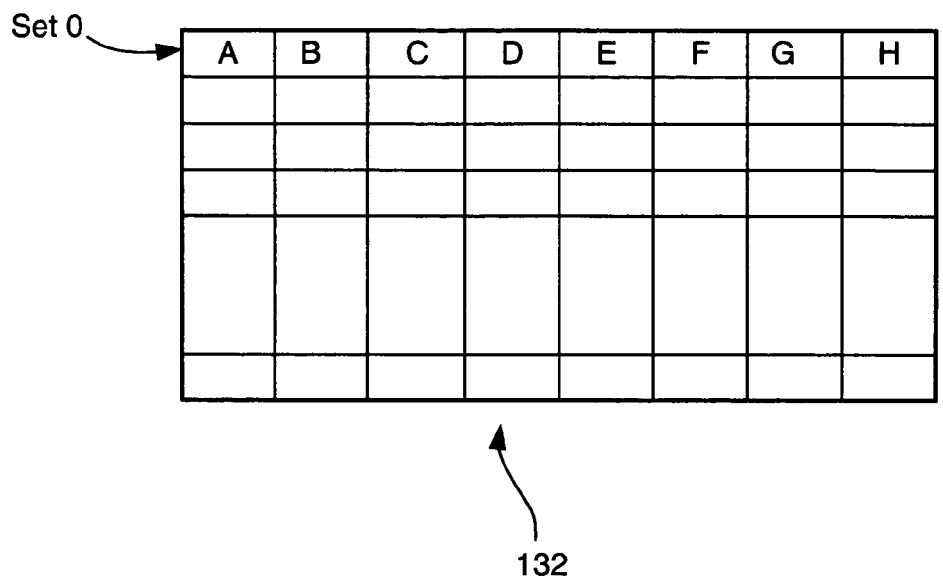
FIG. 4A shows the higher level cache with exemplary cache lines stored in a set.
Figure 4B:
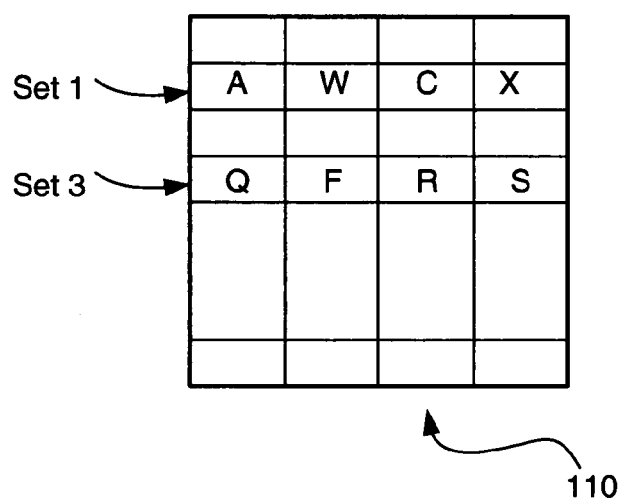
FIG. 4B shows the lower level cache with exemplary cache lines stored in a set.

FIG. 4A and FIG. 4B show particular cache lines in L3 cache 132 and L2 cache 110. Cache lines A, B, C, D, E, F, G, and H are stored in set zero of L3 cache 132 as shown in FIG. 4A. Cache line A is stored in L2 cache 110 at 110-10 (using the naming convention above); cache line C is stored in L2 cache 110 at 110-12; and cache line F is stored at 110-31. Cache lines B, D, E, G, and H do not exist in L2 cache 110 in the example of FIGS. 4A, 4B. Cache lines W, X, Q, R, and S are held in L2 cache 110 and must also exist in L3 cache 132 at locations (not shown) with addresses that map to set 1 (W and X) or set 3 (Q, R, and S). It will be noted that all cache lines that exist in L2 cache 110 also exist in L3 cache 132. However, not all cache lines in L3 cache 132 need to exist in L2 cache 110. As explained earlier, L2 cache 110 can simply write over a first cache line with a newly fetched cache line if the first cache line has not been modified. L2 cache 110 does not inform L3 cache 132 that the first cache line has been written over.

FIGS. 3A, 3B, 4A, 4B and discussion thereof above has focused on physical locations of cache lines in L3 cache 132 and L2 cache 110. Cache directory 111 (shown as cache directories 111A and 111B in FIG. 1) is used to keep track of addresses of cache lines stored in L2 cache 110, and states of cache lines stored in L2 cache 110. Cache directory 136 (FIG. 1) is used is used to keep track of addresses of cache lines stored in L3 cache 132 and states of cache lines stored in L3 cache 132.

Figure 5A:
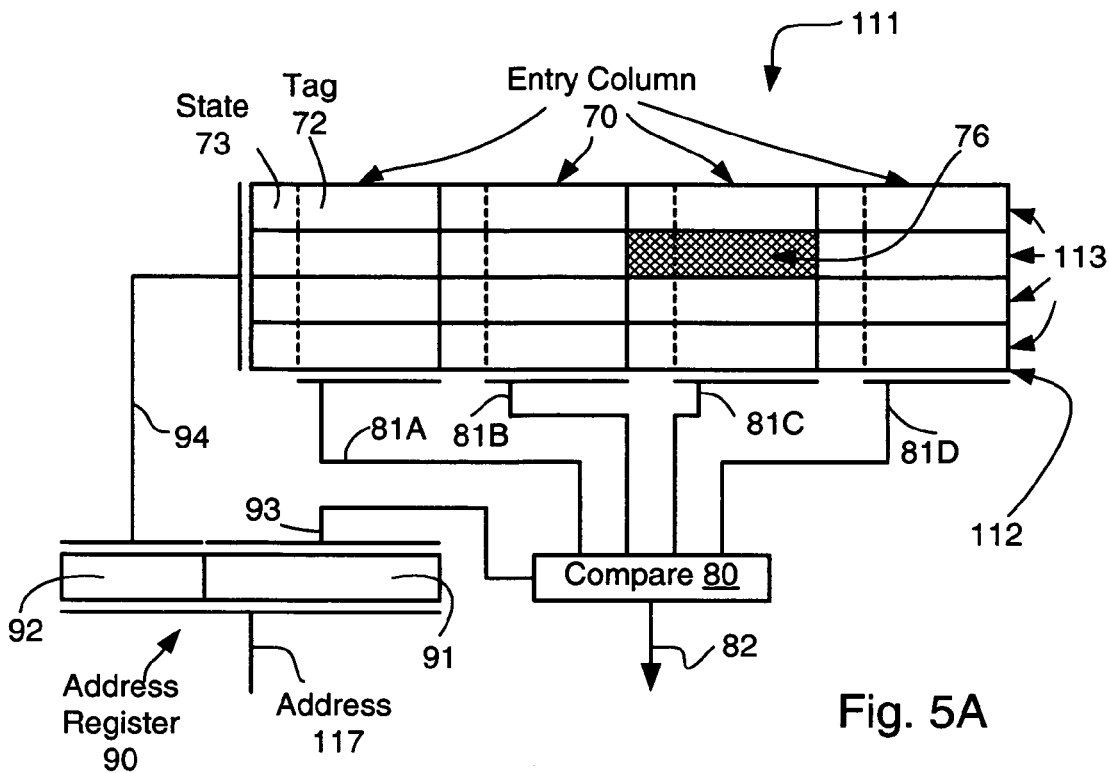
FIG. 5A shows an exemplary cache directory.

An exemplary L2 cache directory 111 is shown in FIG. 5A. L2 cache directory 111 comprises a cache directory array 112 having four entry columns 70; each entry column 70 corresponding to a class in L2 cache 110 (FIG. 3B). L2 cache directory array 112 has M rows 113, each row 113 corresponding to a set in the M sets in L2 cache 111 (FIG. 3B). An L2 cache directory entry 76 (one L2 cache directory entry is identified by crosshatch, numeral "76" and arrow) is stored at each intersection of a row 113 and an entry column 70. An L2 cache directory entry is stored in cache directory array 112 for each cache line stored in L2 cache 111. It will be understood that L3 cache directory 136 is constructed in a similar fashion.

Figure 5B:
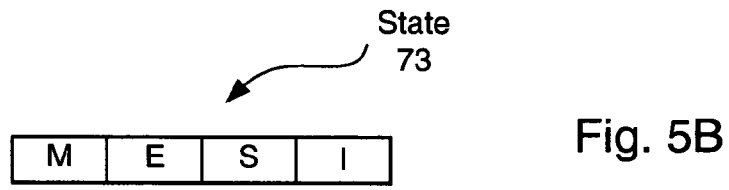
FIG. 5B shows an exemplary state field of an entry in a cache directory.
Figure 5C:
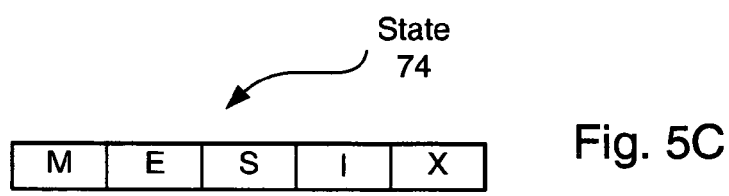
FIG. 5C shows an exemplary state field of an entry in a cache directory, the state field having a bit to indicate an eviction candidate.

Each L2 cache directory entry 76 contains a state field 73 and a tag field 72. A state field 73 holds state information relevant to the corresponding cache line. In many computer systems, the state field comprises four bits, signifying that the corresponding cache line is (1) modified (2) exclusive (3) shared, or (4) invalid. Such state information is called MESI state information. An exemplary state field 73 is shown in FIG. 5B. However, for an embodiment of the invention, an exemplary state field 74 is shown in FIG. 5C, having the MESI state information but also having an "X" bit. The "X" bit in state field 74 is used to flag cache lines that have been identified as eviction candidates as will be described below. The tag field 72 holds a tag portion of an address of a cache line. It will be recognized that a large number of variants of MESI states have been used to enforce cache coherency, and the present invention is not limited to any particular implementation of MESI or any other coherency protocol.

Cache directory 111 further comprises an address register 90 that holds an address sent to the L2 cache directory 111 on address 117 to see if a cache line with that address is in L2 cache directory 111. The address sent to L2 cache directory 111 on address 117 may originate from processor 105 or may originate from memory control 130. A first address portion 92 is used to select one of the M rows of L2 cache directory array 112. A tag portion 91 of the address in address register 90 is sent to a compare 80 on signal 93. Tags 72 are read from the selected row of L2 cache directory array 112 on signals 81A, 81B, 81C, and 81D and are compared against the tag portion of the address. If one of the tags sent on signals 81A, 81B, 81C, and 81D is equal to the tag portion of the address, a cache hit is reported on signal 82. If none of the tags sent on signals 81A, 81B, 81C, 81D is equal to the tag portion of the address, a cache miss is reported on signal 82. State information for each directory is typically read out of L2 cache directory array 112 at the same time as tags 72.

Referring back to FIG. 1, with the above discussion of the workings of L3 cache 132, L3 cache directory 136, L2 cache 110, and L2 cache directory 136 in mind, operation of patrol snoop sequencer 134 will be now described.

Patrol snoop sequencer 134 is coupled to L3 cache directory 136 and to each processor memory bus 115 (processor memory busses 115A and 115B shown in FIG. 1). Patrol snoop sequencer 134 initializes a directory index to address a first row of L3 cache directory 136. L3 Cache directory 136 is read at the index at a time when L3 cache directory 136 is not otherwise in use. L3 cache directory 136 returns eight entries when accessed, corresponding to the eight classes shown in L3 cache 132 in FIG. 3A. Patrol snoop sequencer 134 takes action to determine which, if any, of cache lines in L3 cache 132 no longer exist in L2 cache 110. Patrol snoop sequencer 134 uses the tags stored in each entry of L3 cache directory, along with the index, to form a patrol snoop address. The patrol snoop address is sent on processor memory bus 115 when processor memory bus 115 is otherwise idle to L2 cache directory 111. When L2 cache directory 111 is otherwise idle, a snoop read to cache directory 111 is made. If L2 cache directory 111 reports an L2 cache miss on signal 82, the cache line corresponding to the patrol snoop address does not exist in L2 cache 111. Signal 82 is coupled to patrol snoop 134 on command/status 116 of processor memory bus 115. Patrol snoop sequencer 134 updates the corresponding entry in L3 cache directory 136 by asserting bit "X" in the state 74 field, thereby identifying the cache line as an eviction candidate. If L2 cache directory 111 reports an L2 cache hit on signal 82, the corresponding cache line is still in L2 cache 111, and patrol snoop sequencer 134 does not update the corresponding entry in L3 cache directory 136 to identify the cache line as an eviction candidate. Patrol snoop sequencer 134 repeats the snoop read for each entry in the indexed row of L3 cache directory 136, then increments the index to access the next row of L3 cache directory 136. When the last row of L3 cache directory 136 has been completed, the index is reset to again access the first row. Since patrol snoop sequencer only accesses L3 cache directory 136 when L3 cache directory is idle, and snoop reads are sent on processor memory bus 115 only when processor memory bus 115 is idle, and accesses to L2 cache directory 111 are done only when L2 cache directory 111 is idle, there are no performance penalties for identifying eviction candidates in embodiments of the invention.

Snoop reads must not cause cache lines to be evicted from a L2 cache 110. If a snoop read were to cause a cache line to be evicted, performance degradation would result, since many cache lines in L2 cache 110 are being used by the processor. To prevent unwanted evictions from being caused by a snoop read, replacement logic 109 in processor 105 (FIG. 1) can simply identify a snoop read by interpreting a command on command/status 116 as a snoop read asserted by patrol snoop sequencer 134, recognizing the snoop read, and suppressing any attempt to evict a cache line in the lower level cache in response to the snoop read command.

Patrol snoop sequence 134, in an embodiment, uses information in state 74 from a currently considered entry from L3 cache directory 136 to determine if a snoop read for the currently considered entry should be performed. If the state 74 indicates that the cache line corresponding to the current entry is modified (using a particular MESI state implementation as an example), no snoop read is performed, since the corresponding cache line exists in L2 cache 110. If state 74 indicates that the cache line corresponding to the current entry is shared, a snoop read is performed, since the corresponding cache line may or may not exist in L2 cache 110. Various implementations of cache coherency using MESI treat the "exclusive" state differently. For example, some implementations may define "exclusive" as meaning only one processor has the cache line but perhaps has not modified it; if another processor requests the cache line, the "exclusive" is changed to "shared"; as with "shared", such a cache line may not exist in a lower level cache in such an implementation, and snoop reads should include cache entries having a state of "exclusive". In other implementations of MESI, "exclusive" may mean that the cache line is in use, and therefore should not be an eviction candidate. If state 74 indicates that the cache line corresponding to the current entry is invalid, no snoop read is performed. Typically a state of invalid only occurs during bring up of the computer system. If a cache line is invalid, replacement logic 133 will replace the corresponding cache line, and no snoop read is needed when a state field indicates a cache line is invalid.

It will be understood that, if a cache line marked as an eviction candidate is accessed by a processor 105 prior to being evicted that cache line is re-marked so that it is not an eviction candidate (that is, bit "X", as shown in state 74 in FIG. 5C is de-asserted).

FIG. 1 shows that L3 cache 132 supports two processors 105A, 105B, each with an L2 cache 110A. In an embodiment, memory control 130 keeps track of which L2 caches 110 a particular cache line has been sent to, and only needs to determine if a particular cache line exists in L2 caches 110 to which the cache line was sent. In a second embodiment, memory control 130 does not keep track of which L2 caches 110 a particular cache line has been sent to, and must always check each L2 cache 110 to see if the particular cache line exists in any of the L2 caches 110.

It will be understood that, while L3 and L2 cache systems have been used to illustrate a higher level cache and a lower level cache, that the invention is not limited to L3 and L2 level caches. For example a patrol snoop sequencer associated with L2 cache 110 and L2 cache directory 111 can perform a like function with respect to a level one cache in processor 105 (a level one cache not shown).

Figure 6:
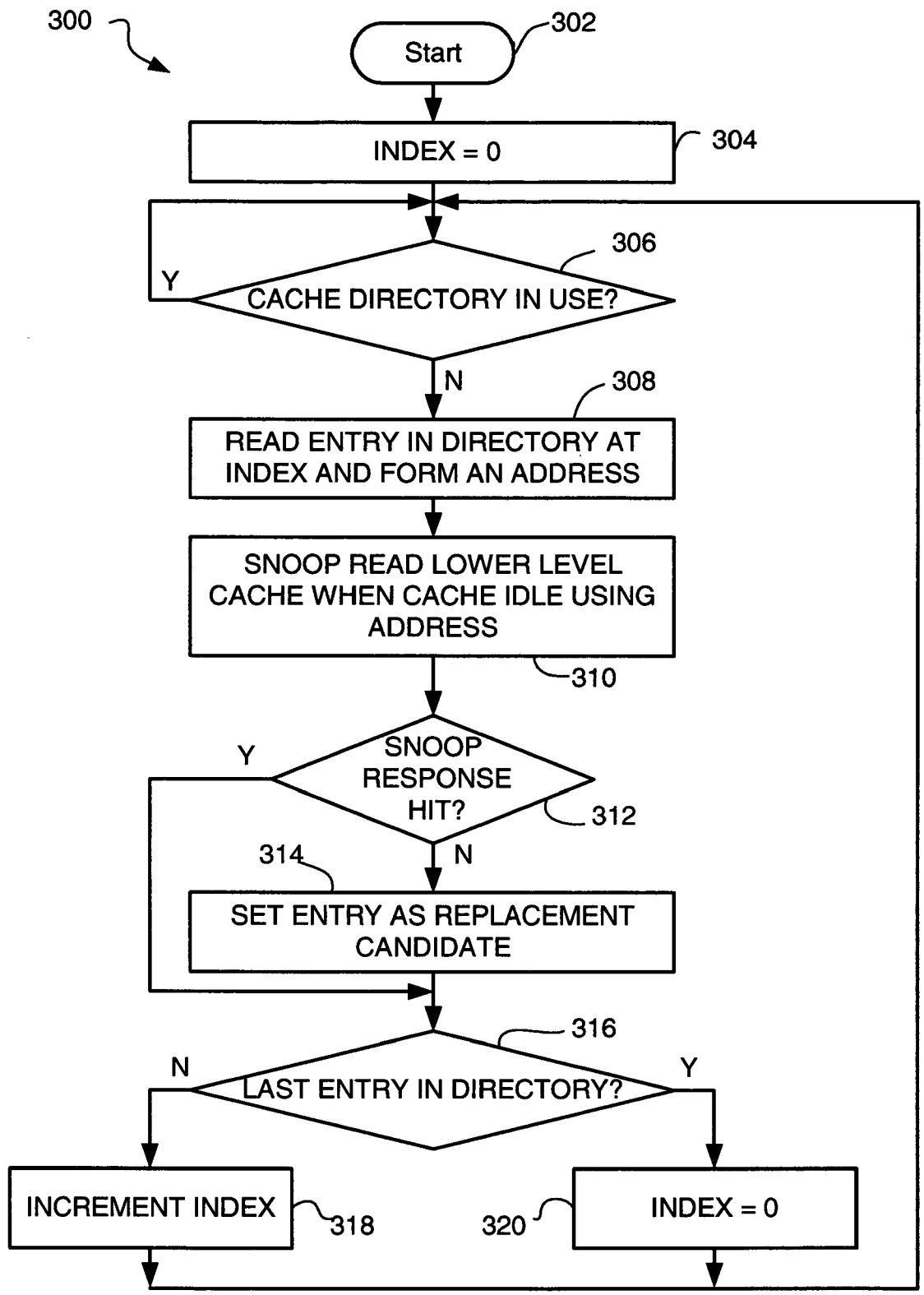
FIG. 6 is a flowchart of a first method for determining eviction candidates in a higher level cache.

Embodiments of the invention can also be expressed as methods. FIG. 6 shows a flowchart of method 300. Method 300 begins at step 302. In step 304, an index to rows in a higher level cache directory is initialized to zero. In step 306, a check is made to see if the higher level cache directory is in use. If the higher level cache directory is in use, control simply passes back to step 306. If the higher level cache directory is not is use, control passes to step 308. In step 308, an entry in the higher level cache directory is read and a snoop patrol address is generated using the index and tag information in the entry. Typically all entries in a row in the higher level cache directory are read out in parallel. If so, a snoop patrol sequencer stores the entries read out in parallel and processes each entry in the row in turn. For example, FIG. 5A shows L2 cache directory array 112 having four entries per row. L3 cache 132 was shown as having eight classes (FIG. 3A), and therefore L3 cache directory 136 includes an L3 cache directory array having eight entries per row (L3 cache directory not shown, but design of L3 cache directory 136 has been described as being designed similarly to L2 cache directory 111).

In step 310, a snoop read is made to a lower level cache directory using the snoop patrol address generated in step 308 when the lower level cache directory is not in use. In step 312, if the snoop read does not report a cache hit in the lower level cache, the entry is marked to flag the corresponding cache line as an eviction candidate. Step 316 determines if the entry used in the last snoop read is the last entry in the higher level cache directory. If not, the index is incremented in step 318 and control is passed to step 306. If so, the index is reset to zero in step 320 and control passes to step 306.

Method 350 shown in FIG. 7 is similar to method 300 (FIG. 6) but includes more detail for an exemplary cache design that uses a MESI state convention.

Method 350 begins at step 352. Step 354 initializes an index, the index corresponding to a particular row in the higher level cache directory. Step 356 checks if the higher level cache directory is in use. If so, step 356 simply branches back to step 356, awaiting a time when the higher level cache directory is not in use.

When step 356 determines that the higher level cache directory is not in use, control passes to step 381. Step 381 reads the higher level cache directory for state information on one or more entries in the higher level cache directory array. As before, a cache directory typically reads out all directory information for a particular row accessed by the index. Step 381 passes control to step 382. Step 382 checks to see if any entry read in step 381 has an invalid state. An invalid state is rare; an invalid state generally only appears during bring up of the computer system. An invalid state for an entry means that the corresponding cache line contains nothing needed by processor 105 and can be overwritten and no snoop read needs to be done. If a cache entry read in step 381 is invalid, step 382 passes control to step 366. If no entry read in step 381 is invalid, step 382 passes control to step 384. Step 384 checks to see if any state is shared. If not, the corresponding cache line is being used in a lower level cache, and the corresponding higher level cache line is not marked as an eviction candidate, and control passes to step 366. If an entry has a shared state, step 384 passes control to step 358 which uses the index and tag information from the directory entry read in step 381 to form an address. Step 360 performs a snoop read to the lower level cache when processor memory bus 115 is unused and when the lower level cache directory is unused. If the snoop response is a hit, the corresponding cache line exists in the lower level cache and is not an eviction candidate. If the snoop response is not a hit (i.e., is a miss), control passes to step 364, which flags the cache line as an eviction candidate by setting state information in the directory entry used to create the snoop read. As explained earlier, a state bit, "X" in the entry can be used to flag a cache line as an eviction candidate. Step 364 then passes control to step 386, which checks if there are any more entries in the current row of entries read in step 381 that have a shared state. If so, control passes to step 358; if not, control passes to step 366.

Step 366 checks if all entries in the higher level cache directory have been considered; that is, the index would address beyond the number of rows in the higher level cache directory array. If not, the index is incremented at step 368; if so, the index is reinitialized to zero at step 370. Steps 368 and 370 pass control back to step 356 and the method continues, using unused higher level cache directory times to read entries, finding entries having a shared state, sending snoop read requests to a lower level cache directory when resources (higher level cache directory, memory processor bus, and lower level cache directory) are idle and determining by a hit or miss response from the lower level cache directory whether or not the shared cache line exists in the lower level cache. If the shared cache line does not exist in the lower level cache, the cache line in the higher level cache is marked as an eviction candidate.

Method 400, shown in FIG. 8, shows how the eviction candidates identified by snoop read embodiments of the present invention, as explained earlier as methods and apparatus, improve replacement choices of known replacement algorithms, for examples, but not limited to, LRU replacement algorithms and pseudo random replacement algorithms.

Method 400 starts at step 402. In step 404, a higher level cache receives a request for data in new cache line that requires eviction of a cache line in the higher level cache. In step 406 the higher level cache determines a row in a cache directory array that contains the entries containing state and tag information for classes that the new cache line will be placed into. In step 408, the row determined in step 406 is read from the cache directory array.

In step 410 a check is made to see if the requested cache line is in the higher level cache. If so, a check is made in step 412 to see if the requested cache line has been marked as an eviction candidate. If the requested cache line has been marked as an eviction candidate, control passes to step 414 which unmarks the requested cache line as an eviction candidate. Step 414 passes control to step 416. If step 412 determines that the requested cache line has not been marked as an eviction candidate, control passes to step 416. Step 416 copies the requested cache line to the lower level cache. Control passes from step 416 to step 426 which ends the method. If step 410 determines that the requested cache line is not in the higher level cache, control passes to step 420.

In step 420, if any entry in the row read in step 408 has an invalid state control passes to step 421 and the requested cache line is written into the class in the higher level cache corresponding to the invalid state entry by step 420, thereby evicting (actually overwriting) the invalid cache line. Step 421 then passes control to step 426 which ends process 400. If step 420 finds that no entries have a state indicating an invalid cache line, control passes to step 422.

In step 422, states in entries in the higher level cache directory array row read in step 408 are checked to see if any entry is marked as an eviction candidate. This step simply examines each entry, in turn, until a first eviction candidate is found. If an eviction candidate is found, control passes to step 423, which writes the requested cache line into the cache line found to be an eviction candidate. Step 423 passes control to step 426, the end of the process. If step 422 finds no entries marked as eviction candidates, control passes to step 424. Step 424 executes any of a number of known replacement algorithms, such as an LRU algorithm or a pseudo random replacement algorithm.

What is claimed is:

1. A method for cache line replacement including the steps of:
    Identifying, without incurring throughput performance penalties, a first cache line in a higher level cache that does not exist in a lower level cache, the identifying further comprising:
        determining, by a patrol snoop sequencer, a first time when a higher level cache directory is not being otherwise used;
    reading one or more cache entries from the higher level cache directory during the first time;
        forming an address of the first cache line in the higher level cache using a tag field from the one or more cache entries from the higher level cache directory;
        transmitting a snoop read via a processor memory bus to the lower level cache using the address of the first cache line;
        sending via the processor memory bus, by a cache directory of the lower level cache, a cache miss signal if the address of the first cache line is not found in the cache directory of the lower level cache; and
        sending via the processor memory bus, by the cache directory of the lower level cache, a cache hit signal if the address of the first cache line is found in the cache directory of the lower level cache; and
    if a cache miss signal is received by the higher level cache, updating a corresponding entry in the higher level cache directory to identify the first cache line as an eviction candidate;

wherein the patrol snoop sequencer performs a cycle through all cache entries in the higher level cache directory and then repeats the cycle; and
    wherein the step of making a snoop read to the lower level cache further comprising the steps of:
        determining a second time when a lower level cache directory is not being otherwise used;
        accessing the lower level cache directory using the address of the cache line in the higher level directory during the second time;
        returning the miss in the lower level cache if the accessing the lower level cache directory using the address of the cache line in the higher level directory during the second time results in a miss in the lower level cache directory; and
        returning the hit in the lower level cache if the accessing the lower level cache directory using the address of the cache line in the higher level directory during the second time results in a hit in the lower level cache directory.

2. The method of claim 1, further comprising the steps of:
    reading state information from the one or more cache entries from the higher level cache directory; and
    if the state information for a particular cache entry in the one or more cache entries from the higher level cache directory indicates that the corresponding cache line is invalid, not performing the steps of claim 1 for the particular entry.

3. The method of claim 1, further comprising the steps of:
    reading state information from the one or more cache entries from the higher level cache directory; and
    if the state information for a particular cache entry in the one or more cache entries from the higher level cache directory indicates that the corresponding cache line is modified, not performing the steps of claim 4 for the particular entry.

4. The method of claim 1, further comprising the steps of:
    receiving a request for data by the higher level cache;
    checking whether a particular cache line containing the data exists in the higher level cache; and
    if the particular cache line exists in the higher level cache, performing the step of:
        removing the identification of the cache line as not existing in the lower level cache if the particular cache line has been identified as not existing in the lower level cache.

5. The method of claim 1, further comprising the steps of:
    if the higher level cache is coupled to a plurality of lower level caches, each lower level cache being at the same level, the step of identify the first cache line in the higher level cache that does not exist in a lower level cache further comprises the step of:
        ensuring that the first cache line does not exist in any of the plurality of lower level caches.

6. The method of claim 1,
    wherein the higher level cache is an L3 cache and the lower level cache is an L2 cache.

7. The method of claim 1,
    wherein the higher level cache is an L2 cache and the lower level cache is an L1 cache.

* * * * *